Aug. 5, 1924.  1,503,791

T. W. S. HUTCHINS
MEANS FOR DISCHARGING GRANULAR AND LIKE MATERIAL
FROM RETORTS AND SIMILAR VESSELS
Filed June 25, 1923

*Inventor*
T. W. S. Hutchins,
By Marks&Clerk
Attys.

Patented Aug. 5, 1924.

1,503,791

UNITED STATES PATENT OFFICE.

THOMAS WILLIAM STAINER HUTCHINS, OF DAVENHAM, ENGLAND.

MEANS FOR DISCHARGING GRANULAR AND LIKE MATERIAL FROM RETORTS AND SIMILAR VESSELS.

Application filed June 25, 1923. Serial No. 647,731.

*To all whom it may concern:*

Be it known that I, THOMAS WILLIAM STAINER HUTCHINS, a subject of the King of Great Britain and Ireland, and resident of Davenham, in the county of Chester, England, have invented certain new and useful Improved Means for Discharging Granular and like Material from Retorts and Similar Vessels, of which the following is a specification.

This invention has for its object the provision of improved means for the discharge of granular and like material from retorts or other vessels in which various substances (such as coals, shales, sawdust and the like) are distilled, calcined or otherwise treated; and where it is necessary or desirable to prevent the escape of gas or vapour from and the inlet of air to the vessel during such discharge.

The invention comprises the combination with an outlet such that the material to be discharged forms a seal or trap therein, of an impeller or the like having such an oscillatory or other motion as will effect the required discharge with the maintenance of the said seal or trap.

Referring to the accompanying sheet of explanatory drawings:—

Figure 1:
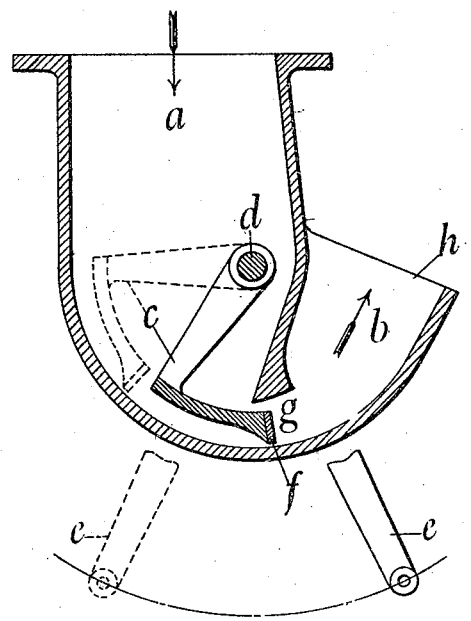
Figure 2:
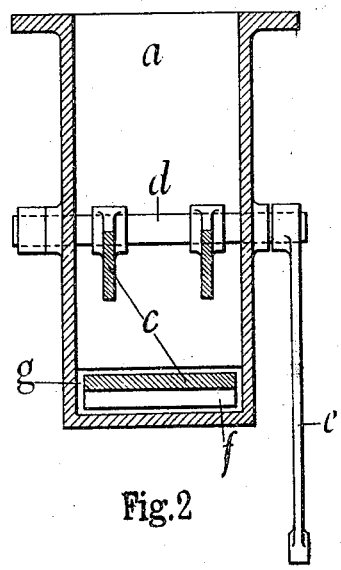

Figure 1 is a sectional side elevation and Figure 2 a sectional end elevation of a discharge device constructed in accordance with this invention.

The same reference letters in the two views indicate the same parts.

In the application of the invention in one convenient manner, and as shown by the illustrated example, the discharge device or valve as it may be termed, consists of a U shaped conduit or fitting having one branch or leg $a$ larger than the other leg $b$. The said conduit or fitting is formed with or attached to the retort or vessel so that the granular or like material to be evacuated, falls down the larger branch $a$ and is pushed out or discharged from the shorter branch $b$ by the action of an impeller or the like as $c$ to which an oscillatory or other motion is imparted in any convenient manner.

The said impeller $c$ may be of the L or like angular shape shown at Figure 1. It is mounted on or secured to a shaft $d$ which extends across the conduit and has a lever $e$ or other operating device affixed to an exterior projection. The opposite end of the impeller takes the form of a push bar $f$ of a length somewhat less than the width of the conduit and of a depth which is less than that of the connecting space or aperture $g$ between the long and short legs or branches $a$ and $b$.

By the movement of the impeller its push bar end $f$ is caused to oscillate or reciprocate in such a path as will, on each oscillation or reciprocation, push a quantity of material from the leg or branch $a$ of the fitting or connection into the short leg or branch $b$, from the upper end $h$ of which it is discharged. The stroke and path of the push bar and the shape of the connecting aperture between the branches are such as to prevent arching or wedging of the material, and the quantity discharged at each stroke is regulated by a variation of the length or amplitude of stroke or the speed of movement or otherwise, so that at all times a sufficient quantity of material is kept at the bottom of the U to maintain the seal. The dotted lines at Figure 1 indicate the range or a part of the range of movement of the lever $e$ and impeller $c$.

The form and arrangement of the valve or discharge device may be modified in various ways to meet varying services or requirements.

I claim:—

1. In apparatus for discharging granular and like materials from retorts and similar vessels, the combination comprising a stationary U-shaped conduit having its legs or branches of unequal length and directed substantially vertically, whereby the lower portion of the conduit will be sealed by material occupying said legs, said conduit having a lower curved wall merging into said legs, and an oscillating impeller arranged in the conduit and having a push-bar movable in a path parallel to said curved wall for forcing material from one leg into the other without breaking the seal formed by said material.

2. In apparatus for discharging granular and like materials from retorts and similar vessels, the combination comprising a fixed U shaped conduit having its legs or branches of unequal length and a restricted connecting space between such legs, an impeller mounted in said conduit and having a push-bar movable over the bottom of said conduit in a path parallel to the latter; and means for oscillating said impeller and push-bar toward and away from said space, whereby the material may be forced from one leg into the other without breaking the seal formed by the material in the legs.

In testimony whereof I have signed my name to this specification.

THOMAS WILLIAM STAINER HUTCHINS.